United States Patent
Mangraviti et al.

(10) Patent No.: US 8,199,536 B2
(45) Date of Patent: Jun. 12, 2012

(54) METHOD AND DEVICE FOR SENSING A CURRENT FLOWING THROUGH AN OUTPUT INDUCTOR OF A PWM DRIVEN CONVERTER

(75) Inventors: Giovanni Mangraviti, Messina (IT); Mario Di Guardo, Gravina di Catania (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 373 days.

(21) Appl. No.: 12/639,693

(22) Filed: Dec. 16, 2009

(65) Prior Publication Data

US 2010/0157628 A1    Jun. 24, 2010

(30) Foreign Application Priority Data

Dec. 19, 2008 (IT) .................................. VA08A0066

(51) Int. Cl.
*H02M 3/335* (2006.01)
(52) U.S. Cl. .................. 363/21.09; 363/21.08; 363/21.1
(58) Field of Classification Search ................. 363/21.1, 363/21.11, 21.09, 21.08
See application file for complete search history.

(56) References Cited

U.S. PATENT DOCUMENTS 6,009,000 A * 12/1999 Siri ............................ 363/21.09
6,424,129 B1   7/2002 Lethellier ...................... 323/272
7,660,135 B2 * 2/2010 Fang ................................ 363/17

FOREIGN PATENT DOCUMENTS

| DE | 4422399 | 1/1996 |
|---|---|---|
| WO | 2004/042906 | 5/2004 |
| WO | 2005/031956 | 4/2005 |

* cited by examiner

*Primary Examiner* — Shawn Riley
(74) *Attorney, Agent, or Firm* — Allen, Dyer, Doppelt, Milbrath & Gilchrist, P.A.

(57) ABSTRACT

A device generates a signal representative of a current flowing through a load inductor of a converter, the converter having a first transformer including a primary winding driven with a pulse width modulated (PWM) voltage signal. The device may include a sense inductor magnetically coupled to the load inductor, and an integrator configured to integrate a voltage drop on the sense inductor and to generate a first signal representative of the current flowing through the load inductor with an offset. The device may further include a second transformer to be magnetically coupled to the primary winding of the first transformer and generating a second signal representative of a current flowing through the primary winding, and a peak detector configured to sample and hold a peak value of the second signal at every cycle of the PWM voltage signal. The device may also include an adder configured to generate the signal representative of the current flowing through the load inductor as a sum of the first signal and the peak value of the second signal.

19 Claims, 3 Drawing Sheets

METHOD AND DEVICE FOR SENSING A CURRENT FLOWING THROUGH AN OUTPUT INDUCTOR OF A PWM DRIVEN CONVERTER

FIELD OF THE INVENTION

This invention relates to pulse width modulated (PWM) converters, and, more particularly, to a method and related device for generating a signal representative of a current flowing through an inductor of a PWM driven converter.

BACKGROUND OF THE INVENTION

Voltage converters are used in numerous applications for powering a load with a controlled voltage. Direct current-direct current (DC-DC) voltage converters are used for supplying welding machines, for example. In the following description, reference may be made to the so-called "forward" DC-DC converters, but what may be stated holds the same throughout for any converter having a transformer that isolates a primary circuit, being connected to a PWM switched power supply, from a secondary circuit including an inductor connected to a load.

A typical architecture of a DC-DC forward converter is depicted in FIG. 1. The isolated DC-DC converter causes energy to be transferred from a primary winding of a transformer to the secondary winding, during PWM on-times Ton. Assuming ideal conditions in the PWM-driven power switches, during the on-time Ton, the diode D1 is in a conduction state and the diode D2 is reverse biased. The voltage across the inductor L1 is assumed to be positive, thus the current flowing through the inductor L1 increases linearly according to the following equations:

$$v_L = \frac{N_2}{N_1} V_{IN} - V_{OUT} \qquad (1)$$
$$0 < t < Ton$$

$$v_L = -V_{OUT} \qquad (2)$$
$$Ton < t < Ts$$

$$\int_0^{Ton} v_L \, dt = -L \int_0^{Ton} \frac{di_l}{dt}, \qquad (3)$$

wherein $v_L$ is the voltage drop on the inductor L1, $i_l$ is the current flowing through the inductor L1, $V_{IN}$ is the voltage drop on the primary winding of the transformer T1, Vout is the output voltage of the converter, and Ts is the PWM switching period.

During the off-time Toff, the voltage across the output inductor L1 is negative and is equal to the output voltage Vout, the diode D2 is in a conduction state, and the diode D1 is reverse biased. The current flowing through the inductor L1 decreases linearly.

Assuming null, the net voltage variation on the inductor L1, integrated during a whole switching period, and assuming the duty-cycle equal to:

$$\delta = \frac{Ton}{Ton + Toff} = \frac{Ton}{Ts}, \qquad (4)$$

the relation between the input and output voltage is:

$$\frac{V_{OUT}}{V_{IN}} = \frac{N_2}{N_1} \delta. \qquad (5)$$

Typically, the output current delivered by a forward converter is controlled by Hall sensors, shunt resistors, or current transformers connected in series to the free-wheeling diodes of the secondary circuit of the converter.

The control of the current delivered by a converter may be critical when the DC-DC converter is used to supply a welding machine. Usually, in low-cost welding machines, a current control is generally carried out only on the primary winding of the low voltage insulation transformer T1. Unfortunately, it may not be possible to ensure a reliable control of the current absorbed by the welding machine by controlling only the current flowing through the primary winding of the transformer.

Indeed, in PWM driven converters, for example, in forward DC-DC converters, the current through the primary winding of the transformer is substantially proportional to the current flowing through the inductor L1 (if the transformer's magnetization current is negligible) only during on-times Ton, i.e. the PWM conduction phase. During off-times Toff, the current flowing through the primary winding is null.

In certain applications, such as in a DC-DC converter supplying a welding machine for manual metal arc (MMA) welding processes, the welding current may be controlled and regulated according to the characteristic of the metal and of the piece to be welded. The output voltage should be left floating and free to be determined by the plasma arc, because the voltage across the plasma arc depends on the distance between the welding electrode and the metal piece to be welded and, in general, this distance is not constant in manual welding processes. As a consequence, it is more convenient to control the current delivered by the converter to the welding machine to achieve good and uniform welding results. This can be done by controlling the current flowing through the inductor L1 that delivers the output current of the converter.

Usually, in DC-DC converters supplying low-cost welding machines, the current delivered by the converter is estimated by sensing the current through the primary winding of the transformer. This technique is preferred because it is less expensive. As stated above, only during the on-time Ton is the current sensed on the primary winding of the transformer representative of the current delivered by the converter. Therefore, it is not possible to control precisely the output current of the converter by knowing only the input current on the primary winding of the transformer. As a matter of fact, with such a technique, the current delivered by a converter is not constant and this may impair the quality of welding. An approach to this problem includes using linear optocouplers or Hall current sensors for more accurately sensing the output current, but this approach may be expensive.

Typically, the current generated by a converter using a transformer is delivered through an inductor that is included in the secondary circuit. By controlling the current flowing through this inductor, the current delivered to a load would also be controllable.

SUMMARY OF THE INVENTION

An effective method and related device have been found to generate a signal representative of current flowing through an inductor of a PWM driven converter. The device for generating a signal representative of the current through this inductor is made with low cost components. The device is adapted to sense and integrate the voltage drop on the output current series inductor and to add to the result of this integration the value of the current through the inductor at the beginning of the off switching phase of the converter. This value to be added is obtained by sampling and holding the peak value of a scaled replica of the current flowing through the primary winding of the transformer of the converter. The voltage drop on the inductor is replicated on a sense inductor, being magnetically coupled with the inductor, and the voltage drop on the sense inductor is integrated by an integrator.

According to an embodiment, the device is used in a closed-loop circuit for controlling the current delivered by a DC-DC forward converter. According to another embodiment, the sense inductor includes a certain number of turns for the first inductor, accessed through a tap according to a variac configuration.

DETAILED DESCRIPTION OF THE PREFERRED EMBODIMENTS

An exemplary embodiment of the method and device for generating a signal representing the current flowing through a series inductor included in the secondary side circuit of a PWM driven converter may be illustrated hereinafter by referring to a DC-DC forward converter. Nonetheless, the disclosed method and device can be used with any kind of converter using an isolation transformer and an inductor in the secondary side circuit for delivering the output current of the converter.

Figure 1:
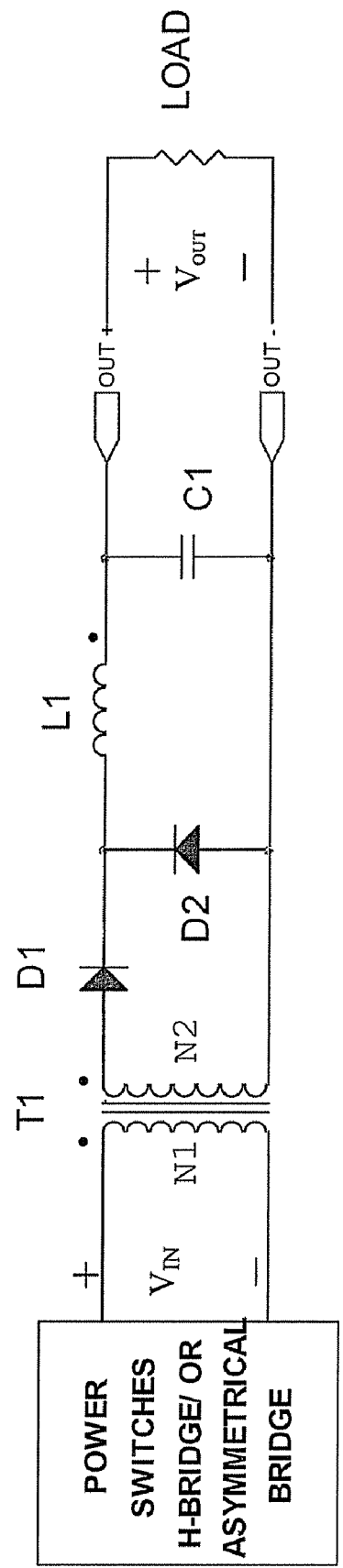
FIG. 1 is a schematic circuit diagram of a DC-DC converter, according to the prior art.

According to the disclosed method and device, the input current flowing through the primary winding of the transformer and the voltage drop on the inductor L1 during the off-time Toff of the PWM switching cycle of the converter are sensed. The voltage drop $v_l$ on the inductor L1 during Toff is the output voltage Vout of the converter, and the current in the inductor L1 of the DC-DC forward converter of FIG. 1 during the off-time Toff and the on-time Ton is determined by the following equations:

$$I_l(t) = \frac{1}{L} \int_{Ton}^{Ts} v_l \, dt \quad (6)$$

$$v_l = -v_{out} \quad (7)$$

and $$I_l(t) = \frac{1}{L} \int_0^{Ton} v_l \, dt \quad (8)$$

$$v_l = v_{in} \frac{N_2}{N_1} - v_{out}, \quad (9)$$

wherein $v_{in}$ is the input voltage on the primary winding of the transformer, Ts is the switching period of the PWM drive signal, and Ts−Ton=Toff. Therefore, the time derivative of the output current during Toff can be determined by sensing the voltage drop on the inductor L1.

Figure 2:
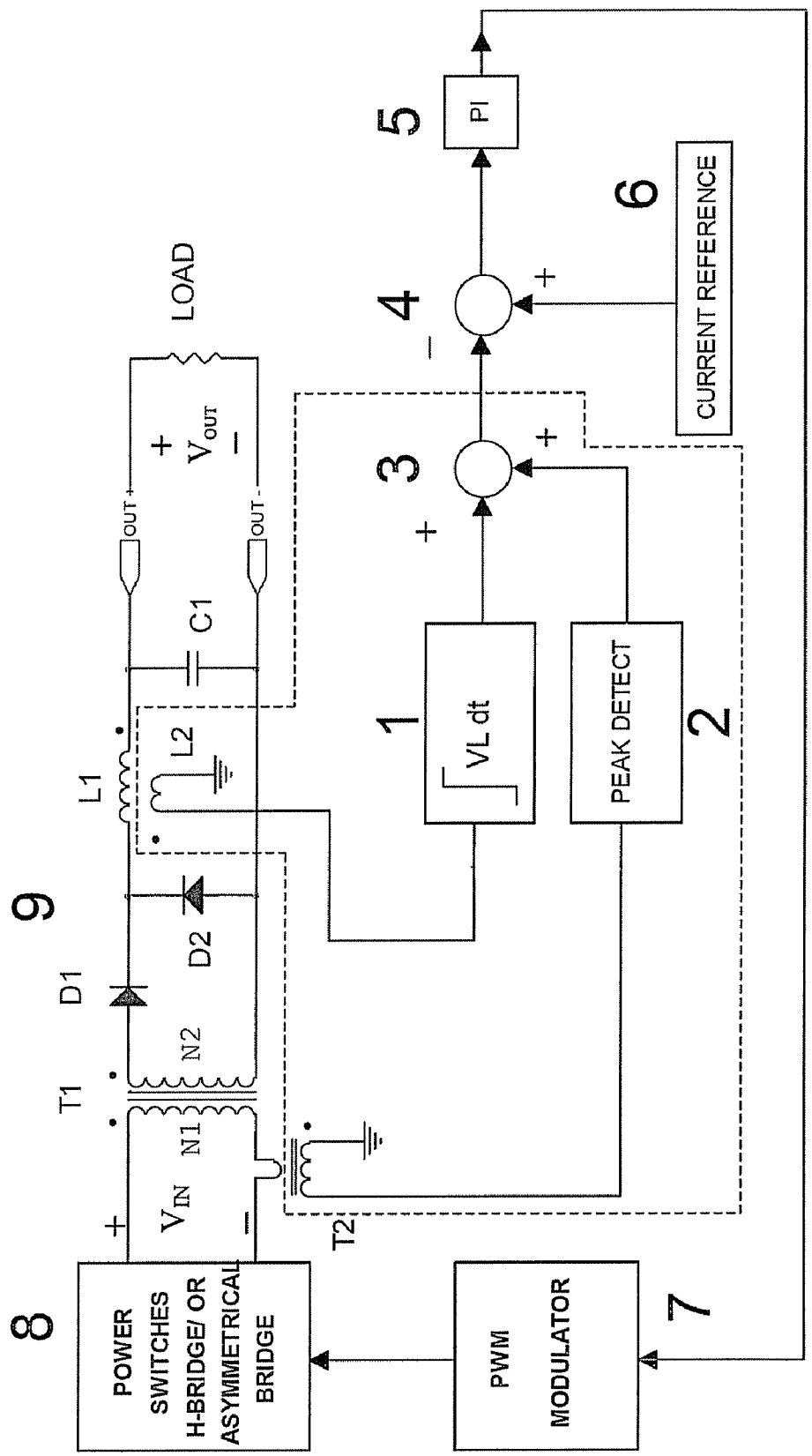
FIG. 2 is a schematic circuit diagram of a device for generating a signal representative of the current delivered by a DC-DC converter and a related closed-loop current control circuit, according to the present invention.

An exemplary embodiment of the device for generating a signal representative of the current flowing through the inductor L1 is depicted in FIG. 2 within the dashed lines. During Toff, the diode D1 is reverse biased, and the inductor L1 is not charged by the secondary winding of the transformer T1. Therefore, by sensing and integrating the voltage drop on the inductor L1, replicated on the sense inductor L2 that is magnetically coupled to the inductor L1, a signal that tracks the current $I_l$ through the inductor during the period Toff is obtained. This signal differs from the current through the inductor L1 by an offset value.

Such an offset value is determined at every PWM switching cycle by sensing the current $I_l$ at the beginning of the off-time Toff. The device of FIG. 2 generates a signal representing the value of the current $I_l$ at the beginning of the off-phase by sampling and holding the peak value of current flowing through the primary winding of the transformer T1. Indeed, this peak value I1_peak is proportional to the current $I_l$(Ton) flowing through the inductor L1 at the beginning of the off-phase according to the following equation:

$$I_l(Ton) = \frac{N_1}{N_2} \cdot I1\_peak, \quad (10)$$

wherein $N_1/N_2$ is the transformer ratio. According to equation (6), by integrating a replica of the voltage drop on the inductor L1 and adding to the result the peak value of the current I1_peak, a signal that tracks precisely the current flowing through the inductor L1 is generated.

The disclosed device can be used in a closed-loop circuit for controlling a converter, as illustrated in FIG. 2. On the primary winding, the auxiliary transformer T2 senses the input current of the converter, i.e. the current flowing through the primary winding of the transformer T1. This information is input to a peak detector 2, that samples and holds the peak value at its input. By integrating with the integrator 1, the voltage drop on the sense inductor L2 is magnetically coupled to the inductor L1, and a signal that tracks with an offset the current through the inductor L1 is obtained.

According to an alternative embodiment, the sense inductor L2 includes a certain number of turns of the inductor L1 accessed via a tap, according to a variac configuration, and the integrator 1 integrates the voltage drop on these turns. The adder 3 adds the output of the integrator 1 to the peak value held by the peak detector 2, and the adder 3 generates a representative signal that tracks the current through the inductor L1. Such a representative signal may be used as a feedback signal by a controller of any kind adapted to control in a closed-loop mode the PWM switching.

In the exemplary embodiment of FIG. 2, the representative signal is subtracted from a reference signal CURRENT REFERENCE for generating an error signal. The error signal is input to a controller, that in this example is a Proportional Integral (PI) controller, though any other kind of controller could be used, that adjusts the duty cycle of the PWM modulator that drives the power switches that generates the primary voltage $V_{IN}$.

In the example of FIG. 2, an adder 4 generates an error signal, that is fed to a PI regulator 5 to control and regulate the current through the inductor L1, in presence of variations of the load and of the output voltage of the DC-DC converter. The circuit block 7 instantaneously adjusts the duration of Ton of the circuit block 8.

Figure 3:
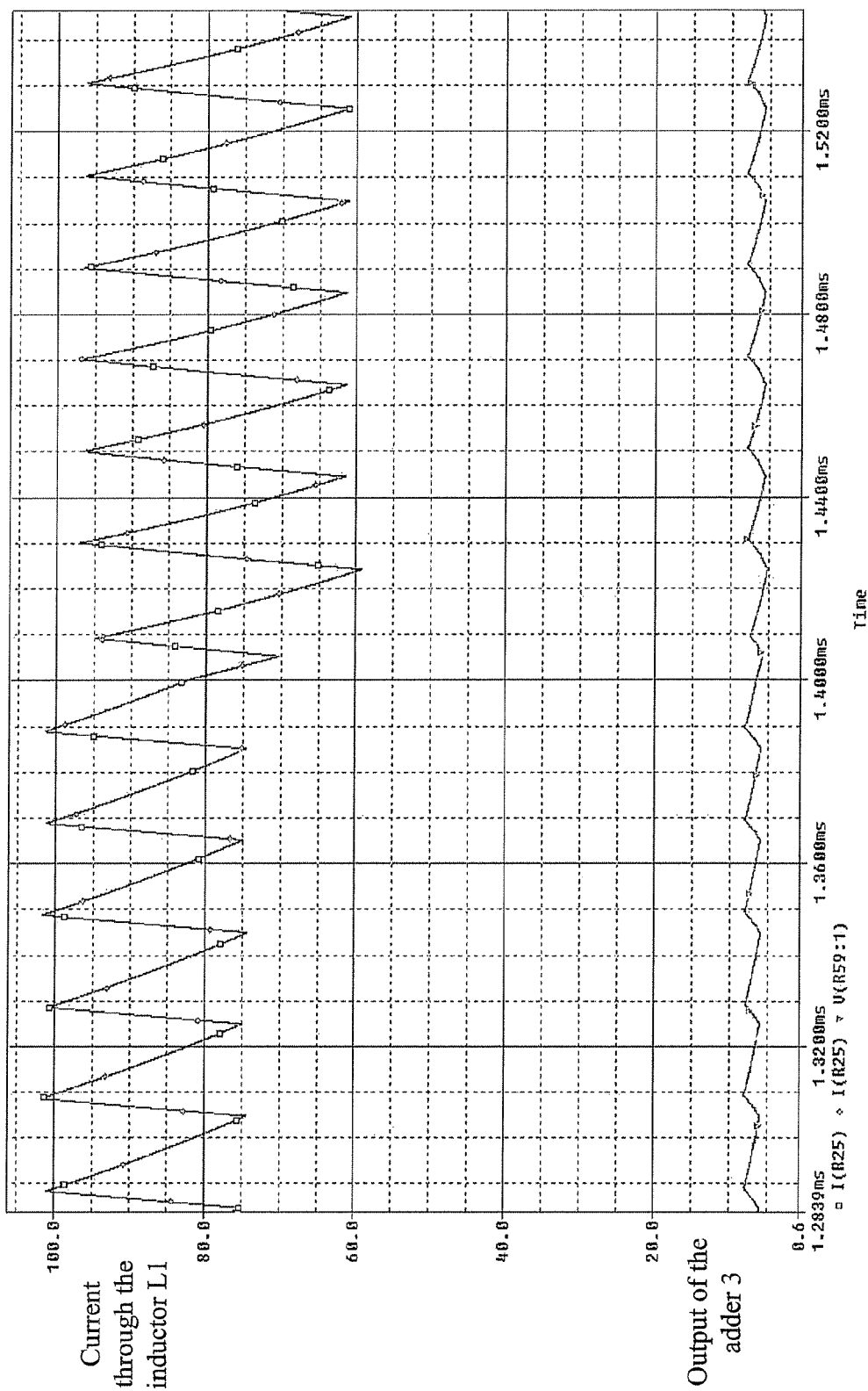
FIG. 3 is a diagram of time graphs obtained through a PSPICE simulation of the device of FIG. 2, specifically, the output current of the DC-DC converter and of the signal generated by the adder in FIG. 2.

The disclosed circuit of FIG. 2 has been simulated with PsPice_A/D software using typical test values. FIG. 3 depicts the obtained graphs of the current through L1 and of the signal generated by the adder 3. At about 1.4 ms on the time axis, the load of the DC-DC converter was abruptly varied for verifying the ability of the disclosed closed-loop circuit of tracking the current flowing through the inductor L1.

That which is claimed is:

1. A device for generating a signal representative of a current flowing through a load inductor of a converter, the converter having a first transformer including a primary winding driven with a pulse width modulated (PWM) voltage signal, the device comprising:
   a sense inductor magnetically coupled to the load inductor;
   an integrator configured to integrate a voltage drop on said sense inductor and to generate a first signal representative of the current flowing through the load inductor with an offset;
   a second transformer to be magnetically coupled to the primary winding of the first transformer and generating a second signal representative of a current flowing through the primary winding;
   a threshold detector configured to sample and hold a threshold value of the second signal at every cycle of the PWM voltage signal; and
   a circuit configured to generate the signal representative of the current flowing through the load inductor based upon the first signal and the threshold value of the second signal.

2. The device of claim 1 wherein said circuit comprises an adder; and wherein said adder is configured to generate the signal representative of the current flowing through the load inductor as a sum of the first signal and the threshold value of the second signal.

3. The device of claim 1 wherein the threshold detector comprises a peak detector configured to sample and hold a peak value of the second signal at every cycle of the PWM voltage signal; and wherein said circuit is configured to generate the signal representative of the current flowing through the load inductor based upon the first signal and the peak value of the second signal.

4. The device of claim 1 wherein said sense inductor includes a selectable number of turns.

5. The device of claim 1 wherein the load inductor delivers an output current of the converter to a load.

6. The device of claim 1 wherein the converter comprises a direct current-direct current (DC-DC) forward converter.

7. A closed-loop circuit for generating a feedback signal representing a current flowing through a load inductor of a converter having a first transformer including a primary winding driven with a pulse width modulated (PWM) voltage, the closed-loop circuit comprising:
   a device configured to generate a signal representative of the current flowing through the load inductor comprising
      a sense inductor magnetically coupled to the load inductor,
      an integrator configured to integrate a voltage drop on said sense inductor and to generate a first signal representative of the current flowing through the load inductor with an offset,
      a second transformer to be magnetically coupled to the primary winding of the first transformer and generating a second signal representative of a current flowing through the primary winding,
      a peak detector configured to sample and hold a peak value of the second signal at every cycle of the PWM voltage signal, and
      a first circuit configured to generate the signal representative of the current flowing through the load inductor based upon the first signal and the peak value of the second signal; and
   a second circuit configured to generate a feedback signal being a low-pass filtered replica of a difference between a reference value and the signal representative of the current flowing through the load inductor.

8. The closed-loop circuit of claim 7 wherein said first circuit comprises an adder; and wherein said adder is configured to generate the signal representative of the current flowing through the load inductor as a sum of the first signal and the peak value of the second signal.

9. The closed-loop circuit of claim 7 wherein said second circuit comprises an adder.

10. The closed-loop circuit of claim 7 wherein said sense inductor includes a selectable number of turns.

11. The closed-loop circuit of claim 7 wherein the load inductor delivers an output current of the converter to a load.

12. The closed-loop circuit of claim 7 wherein the converter comprises a direct current-direct current (DC-DC) forward converter.

13. The closed-loop circuit of claim 7 wherein the feedback signal is an error signal for modifying the PWM voltage.

14. A method of generating a signal representative of a current flowing through a load inductor of a converter, the converter having a first transformer including a primary winding driven with a pulse width modulated (PWM) voltage signal, the method comprising:
   sensing the current flowing through the load inductor;
   generating a first signal representative of the current flowing through the load inductor with an offset;
   sensing a current flowing through the primary winding and generating a second signal representative of the current flowing through the primary winding;
   sampling and holding at every switching cycle of the PWM voltage signal a threshold value of the second signal; and
   generating the signal representative of the current flowing through the load inductor of the converter based upon the first signal and the threshold value of the second signal.

15. The method of claim 14 wherein generating the signal representative of the current flowing through the load inductor comprises generating the signal representative of the current flowing through the load inductor as a sum of the first signal and the threshold value of the second signal.

16. The method of claim 14 wherein the threshold value comprises a peak value of the second signal.

17. The method of claim 14 wherein the sense inductor includes a selectable number of turns.

18. The method of claim 14 wherein the load inductor delivers an output current of the converter to a load.

19. The method of claim 14 wherein the converter comprises a direct current-direct current (DC-DC) forward converter.

* * * * *